United States Patent
Mor et al.

(10) Patent No.: US 7,453,219 B2
(45) Date of Patent: Nov. 18, 2008

(54) METHOD AND APPARATUS FOR CONTROLLING ILLUMINATION OF A DISPLAY IN A PORTABLE WIRELESS COMMUNICATION DEVICE

(75) Inventors: Tal Mor, Coral Springs, FL (US); Erel Tal, Plainsboro, NJ (US)

(73) Assignee: Motorola, Inc., Schaumburg, IL (US)

( * ) Notice: Subject to any disclaimer, the term of this patent is extended or adjusted under 35 U.S.C. 154(b) by 688 days.

(21) Appl. No.: 10/608,309

(22) Filed: Jun. 27, 2003

(65) Prior Publication Data
US 2004/0263084 A1 Dec. 30, 2004

(51) Int. Cl.
*H05B 37/02* (2006.01)
*H04B 1/38* (2006.01)

(52) U.S. Cl. .................. 315/360; 455/566; 455/572
(58) Field of Classification Search .......... 315/360, 315/307–308; 455/566, 572; 379/88.08, 379/88.09, 88.11, 88.12
See application file for complete search history.

(56) References Cited

U.S. PATENT DOCUMENTS

| | | | |
|---|---|---|---|
| 5,398,022 A | * 3/1995 | Lipp | 340/7.52 |
| 5,970,419 A | 10/1999 | Terashima et al. | 455/566 |
| 2002/0039914 A1 | * 4/2002 | Hama et al. | 455/566 |
| 2003/0162558 A1 | * 8/2003 | Takase et al. | 455/550 |
| 2004/0139842 A1 | * 7/2004 | Brenner et al. | 84/477 R |

* cited by examiner

*Primary Examiner*—Thuy Vinh Tran
(74) *Attorney, Agent, or Firm*—Steven May

(57) ABSTRACT

A portable wireless communication device having a display screen, a light source that is capable of illuminating the display screen, and a processor coupled to the light source, dynamically adjusts a period of time during which the display screen is illuminated. The processor couples power to the light source to illuminate the display screen, determines at least one illumination time parameter associated with information to be displayed on the display screen, and maintains a coupling of power to the light source for a period of time that is based on the at least one illumination time parameter. In other embodiments of the present invention, the processor may further determine to not illuminate the display screen, or to terminate illumination of the display screen prior to expiration of the period of time, based on a received instruction or a detected level of ambient light.

12 Claims, 3 Drawing Sheets

METHOD AND APPARATUS FOR CONTROLLING ILLUMINATION OF A DISPLAY IN A PORTABLE WIRELESS COMMUNICATION DEVICE

FIELD OF THE INVENTION

The present invention relates generally to portable wireless communication devices, and in particular to controlling lighting of a display included in a portable wireless communication device.

BACKGROUND OF THE INVENTION

A conventional cellular telephone includes a display screen that displays information for use by a user of the telephone. As cellular telephones have evolved to include ever increasing functionality, the display screens of the telephones have correspondingly evolved to provide the capability to display wider ranges of information. As a result, the current generation of digital cellular telephones includes a display screen comprising a liquid crystal display (LCD) capable of displaying both text and images, which display screen is typically illuminated by a backlight for good visibility.

The typical cellular telephone features an automatic display backlight that turns on for a pre-defined period of time after depression of a key in a keypad of the telephone. The time duration of the turn-on period may vary from telephone-to-telephone but typically is approximately 10 seconds. As cellular telephones become more data oriented and include bigger displays capable of displaying more content, the turn-on period may increase in order to enable a user of the telephone to read a full screen of information. In addition, due to such data features as email and Internet browsing, the use of the display backlight may increase in frequency.

The display backlight of a cellular telephone is sourced power by a limited life power source, typically a limited life storage battery. The use of the backlight imposes a current drain on the battery, thereby reducing the remaining life of the battery before the battery requires a recharge. Since the battery provides the power for the operation of all elements of the telephone, battery life is a constraining factor in the operation of a cellular telephone. Battery life is also important marketing feature of cellular telephones as cellular telephone manufacturers distinguish their telephones from other cellular telephones based on, among other things, a number hours of operation of a cellular telephone before the telephone battery must be recharged.

Therefore a need exists for a method and an apparatus in a cellular telephone for optimizing a length of time that a backlight of a cellular telephone is on, thereby preserving a battery life of the battery powering the telephone.

DESCRIPTION OF A PREFERRED EMBODIMENT

To address the need for a method and apparatus in a cellular telephone for optimizing a length of time that a backlight of a cellular telephone is on, thereby preserving a battery life of the battery powering the telephone, a portable wireless communication device having a display screen, a light source that is capable of illuminating the display screen, and a processor coupled to the light source, dynamically adjusts a period of time during which the display screen is illuminated. The processor couples power to the light source to illuminate the display screen, determines at least one illumination time parameter associated with information to be displayed on the display screen, and maintains a coupling of power to the light source for a period of time that is based on the at least one illumination time parameter In other embodiments of the present invention, the processor may further determine to not illuminate the display screen, or to terminate illumination of the display screen prior to expiration of the period of time, based on a received instruction or a detected level of ambient light.

Generally, the present invention encompasses a method for controlling an illumination of a display screen in portable wireless communication device. The method includes illuminating a display screen, determining at least one illumination time parameter corresponding to the information to be displayed on the display screen, and maintaining the illumination of the display screen for a period of time that is based on the at least one illumination time parameter.

Another embodiment of the present invention encompasses an apparatus for controlling illumination of a display screen in portable wireless communication device. The apparatus includes a light source that is capable of illuminating the display screen and a processor coupled to the light source. The processor couples power to the light source to illuminate the display screen, determines at least one illumination time parameter corresponding to the message to be displayed on the display screen, and maintains a coupling of power to the light source for a period of time that is based on the at least one illumination time parameter.

Yet another embodiment of the present invention provides a portable wireless communication device having a display screen, a light source that is capable of illuminating the display screen, and a processor coupled to the light source. The processor couples power to the light source to illuminate the a display screen, determines at least one illumination time parameter corresponding to the message to be displayed on the display screen, and maintains a coupling of power to the light source for a period of time that is based on the at least one illumination time parameter, wherein the coupling of power to the light source causes the light source to illuminate the display screen.

Figure 1:
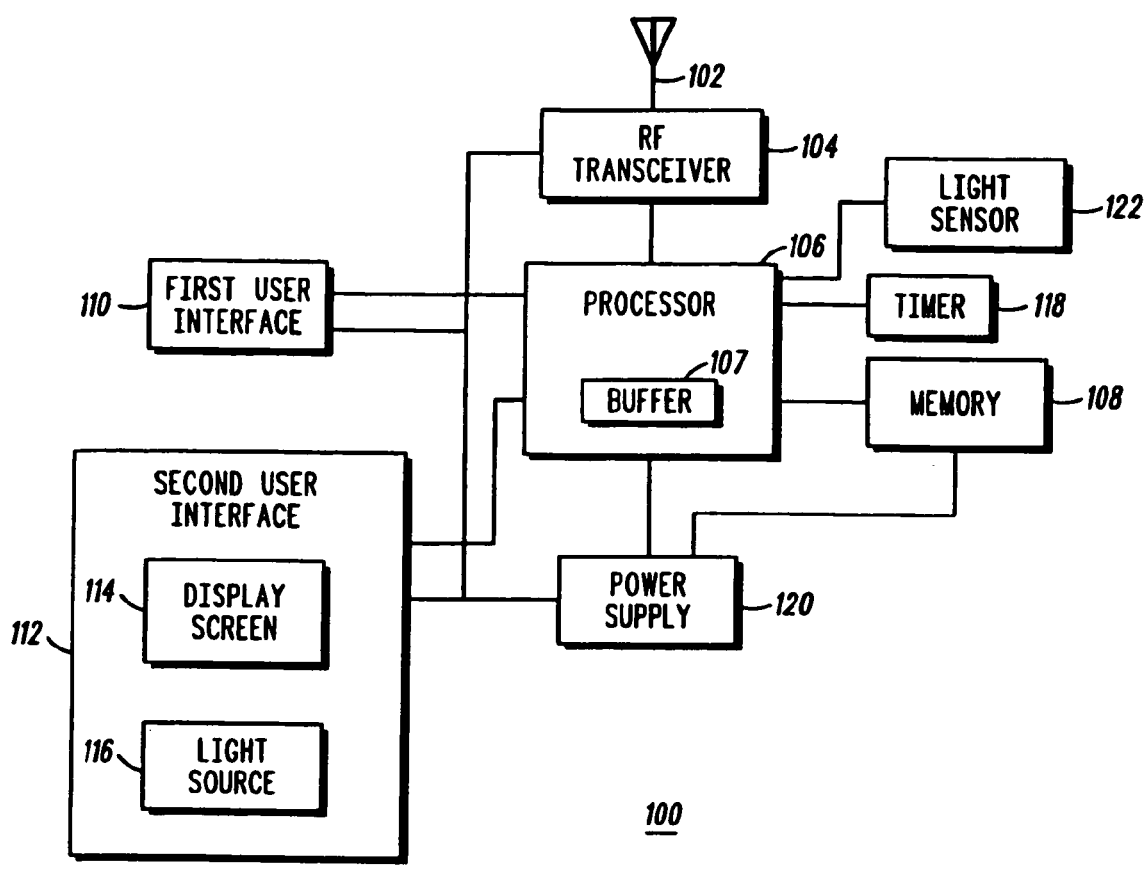
FIG. 1 is a block diagram of portable wireless communication device in accordance with an embodiment of the present invention.

The present invention may be more fully described with reference to FIGS. 1-3. FIG. 1 is a block diagram of a portable wireless communication device 100 in accordance with an embodiment of the present invention. Preferably, communication device 100 is a cellular telephone; however, communication device 100 may be any portable wireless communication device, such as but not limited to a cellular telephone, mobile telephone, cordless telephone, radiotelephone, personal digital assistant (PDA), or pager having an illuminated user display that is sourced power by a limited life power supply, such as a storage battery.

Communication device 100 includes an antenna 102 coupled to a radio frequency (RF) transceiver 104. Communication device 100 further includes a processor 106, such as one or more microprocessors, microcontrollers, digital signal processors (DSPs), combinations thereof or such other devices known to those having ordinary skill in the art, coupled to RF transceiver 104 and further coupled to each of a memory device 108, a first user interface 110, and a second user interface 112. Memory device 108, such as random access memory (RAM), dynamic random access memory (DRAM), and/or read only memory (ROM) or equivalents thereof, stores data and programs that may be executed by processor 108 in the operation of communication device 100. Communication device 100 further includes a power supply 120, such as a nickel-cadmium battery, a nickel-hydrogen battery, or a lithium-ion battery, which sources power, that is, current and/or voltage, to each of the other components of communication device 100 in order to facilitate an operation of each of such other components. Communication device 100 may further include a light sensor 122 coupled to processor 106 for detecting a level of ambient light.

First user interface 110 provides a user of communication device 100 with a capability of inputting instructions into the communication device. In one embodiment of the present invention, user interface 110 includes a keypad that includes multiple keys, such as dial keys typical of a conventional cellular telephone keypad and function keys that permit a user of communication device 100 to convey instructions to processor 106. In another embodiment of the present invention, user interface 110 may comprise a display screen, preferably a touch screen that is able to determine a position (i.e., an X-coordinate and a Y-coordinate) of a user's touch on the touch screen and convey the position data to processor 106. Based on the position data, processor 106 then translates the user's touch into an instruction. Preferably, the touch screen may display a "keypad" screen that comprises multiple softkeys, such softkeys corresponding to keys on a conventional cellular telephone keypad.

Second user interface 112 comprises a display screen 114, preferably a liquid crystal display (LCD), and an associated light source 116, such as an incandescent lamp or a light emitting diode (LED). Display screen 114 displays information for use by a user of communication device 100, such as text and/or images stored in memory device 108 or recieved by the communication device from an information source external to the communication device, such as the Internet. For example, display screen 114 may display text and/or icons associated with a menu of functions that may be performed by communication device 100, a menu of telephone numbers, text and/or icons associated with one or more individuals whose profiles are stored in memory device 108, or text and/or images retrieved by the communication device from the Internet. Light source 116 provides light to permit good visibility of display screen 114 and preferably comprises a backlight that illuminates the display screen from the rear. In another embodiment of the present invention, first user interface 110 may be included in second user interface 112 and, in particular, a display screen of user interface 110 may be included in display screen 114 of the second user interface.

When communication device 100 powers up and/or a user of communication device 100 depresses a key or touches a softkey of first user interface 110, light source 116 turns on and illuminates display screen 114. While on, light source 116 draws power from power supply 120, thereby reducing a remaining life of the power supply. In order to optimize a lifetime of power supply 120 before the power supply needs to be recharged, or replaced when the power supply is not rechargeable, communication device 100 dynamically adjusts an illumination period of display screen 114, that is, a time period during which power is coupled to light source 1116, based on one or more of device operation, content displayed, and ambient lighting. By providing a dynamically adjustable illumination period, communication device 100 is able to limit the power drain imposed by light source 116 on power supply 120 to that which is appropriate for the current use of the communication device, thereby preserving a remaining life of the power supply.

Figure 2:
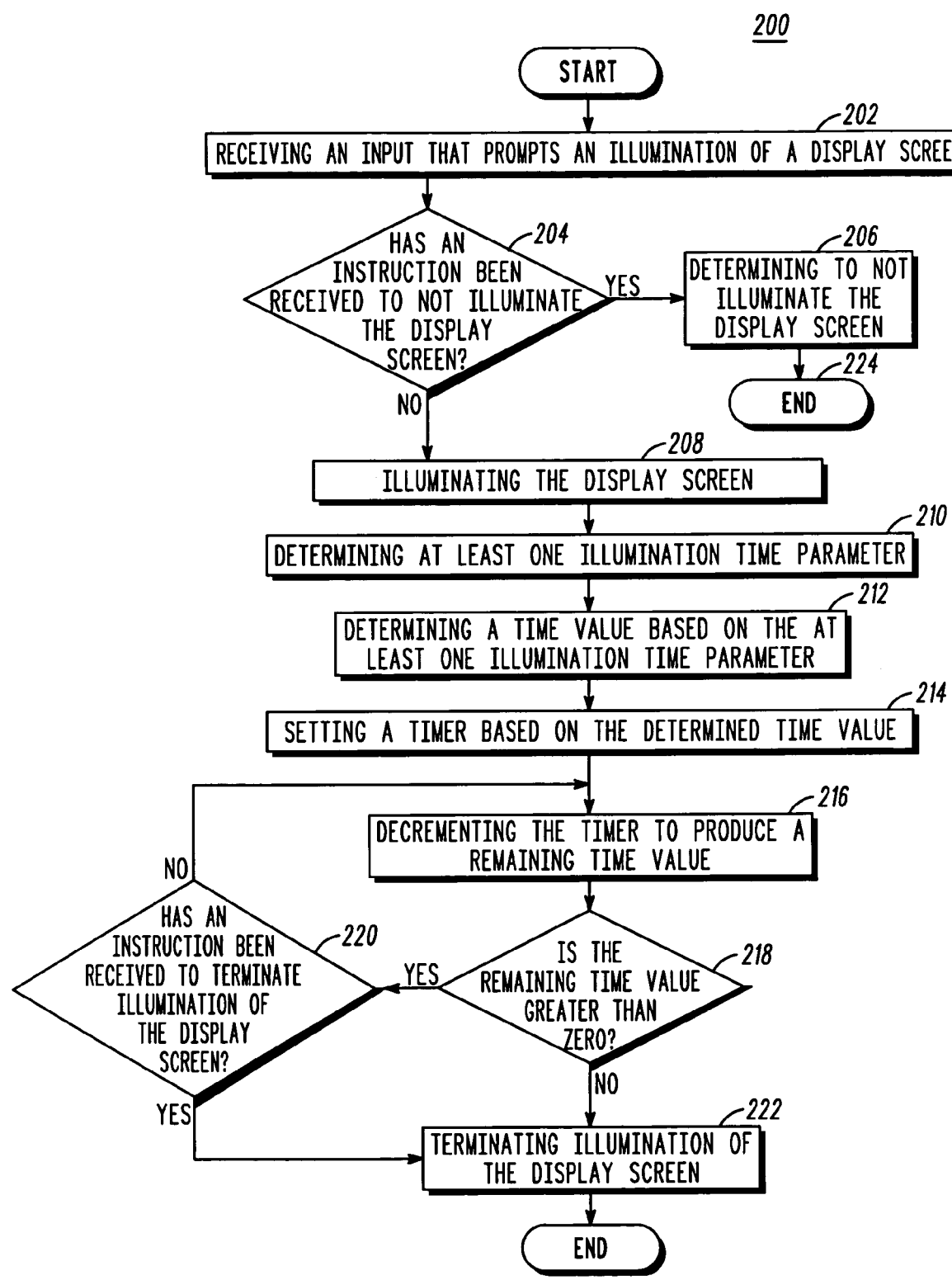
FIG. 2 is a logic flow diagram of a method performed by the communication device of FIG. 1 in controlling an illumination period of a display screen in accordance with various embodiments of the present invention.

FIG. 2 is a logic flow diagram 200 of a method by which communication device 100 controls an illumination period of display screen 114 in accordance with an embodiment of the present invention. Logic flow diagram 200 begins when processor 106 receives (202) an input prompting an illumination of display screen 114. For example, the input may comprise an instruction to power up communication device 100, which instruction may be generated in response to a user of communication device 100 depressing a 'power' key or touching a 'power' softkey in first user interface 110. By way of another example, the input may comprise an instruction to perform a device operation, such as to adjust a volume of the device or to change a mode of operation of the device, which instruction is also input into communication device 100 via first user interface 110 by a user of the communication device. By way of yet another example, the input may comprise information received by the communication device, and in particular by processor 106, for display on display screen 114, such as caller identification. However, the event prompting an illumination of light source 116 is not critical to the present invention and those who are of ordinary skill in the art realize that processor 106 may illuminate display screen 114 in response to any one of numerous events without departing from the spirit and scope of the present invention.

When an instruction is received (204) to not illuminate display screen 114, processor 106 determines (206) not to illuminate the display screen notwithstanding receipt of an input prompting an illumination of display screen 114. For example, communication device 100, and in particular processor 106, may receive an instruction from a user of the communication device to not illuminate the display screen in order to conserve battery power. For example, first user interface 110 of communication device 100 may include key or a softkey corresponding to an instruction to terminate an illumination of display screen 114. When a user of the communication device 100 depresses the key or touches the softkey, a signal is generated that corresponds to an instruction to not illuminate the display screen 114. Upon receiving the signal, processor 106 determines (206) not to illuminate the display screen notwithstanding receipt of an input prompting an illumination of display screen 114.

When no instruction is received (204) to not illuminate display screen 114, in response to receiving the input prompting an illumination of display screen 114, processor 106 illuminates (208) display screen 114, preferably by coupling power to light source 116. For example, processor 106 may be directly connected to light source 116 and may illuminate the light source by providing power to the light source, or processor 106 may control a switch (not shown) coupled between the light source and power supply 120 and provide power to the light source by enabling, or activating, the switch. Processor 106 further determines (210) at least one illumination time parameter that is used to dynamically determine a period of time during which to illuminate display screen 114. Processor 106 determines (212) a time value based on the at least one illumination time parameter and sets (214) a timer 118 coupled to the processor based on the determined time value. The time value corresponds to a time period during which display screen 114 may continue to be illuminated.

In one embodiment of the present invention, the at least one illumination time parameter may correspond to a desired length of time for displaying a message of a particular message type. That is, display screen 114 may be capable of displaying messages of multiple message types. Each message type of the multiple message types is associated with an illumination time parameter, which illumination time parameter corresponds to a desired length of time for displaying a message of the message type on display screen 114. Each message type of the multiple message types is stored in memory device 108 in association with the corresponding illumination time parameter. When processor 106 receives a message of a particular message type or receives an instruction to display a message of a particular message type, the processor retrieves from memory device 108 the illumination time parameter associated with the message type and illuminates display screen 114 for a period of time associated with the retrieved illumination time parameter.

For example, a first message type of the multiple message types may comprise a short duration message, such as a phone operation message such as a volume control message, a mode selection message for selecting a mode of operation such as text messaging, two-way radio operation, internet browsing, or voice recording, or a name list scroll. Memory device 108 may maintain the first message type in association a first illumination time parameter that corresponds to a desired length of time for displaying a message of the first message type, such as 2 or 3 seconds. A second message type of the multiple message types may comprise a long duration message, such as a textual content message such as electronic mail (email) or a stock quotation, that is maintained in memory device 108 in association a second illumination time parameter, such as anywhere between 5 to 10 seconds. When processor 106 determines to display either a message of the first message type or a message of the second message type on display screen 114, the processor retrieves the associated illumination time parameter from memory device 108 in order to determine a time value corresponding to a period of time during which to illuminate display screen 114.

In another embodiment of the present invention, the at least one illumination time parameter may comprise multiple illumination time parameters. A first illumination time parameter of the multiple illumination time parameters may be associated with a message length or a number of lines required for display of a message on display screen 114. A second illumination time parameter of the multiple illumination time parameters may be a time constant, such as a base time period, that is associated with each unit of length of a message or with each line of display screen 114 required to display the message. Upon receiving a message, or an instruction to display a message, processor 106 determines the first illumination time parameter. For example, processor 106 may store a received message in a buffer 107 associated with the processor and determine, based on the stored message, the first illumination time parameter, that is, a length of the message or a quantity of lines of display screen 114 that will be required to display the message. Processor 106 further retrieves the second illumination time parameter, that is, the time constant, from memory device 108. Preferably, the time constant is set by the user of the communication device 100 and maintained in memory device 108. Based on the first and second illumination time parameters, for example, by multiplying the first illumination time parameter by the second illumination time parameter, processor 106 then determines a time value corresponding to a period of time during which to illuminate display screen 114.

For example, when communication device 100 receives a text message, such as a stock quote or other electronic mail, processor 106 stores the text message in buffer 107 and determines a length of the message or a number of lines of display screen 114 that will be required to display the message. Processor 106 retrieves a time constant, for example, anywhere from 2 to 5 seconds, associated with each unit of message length, for example, per 14 characters, or associated with each line of display screen 114 that will be required to display the message. Based on the length of the message or the number of lines required to display the message and the time constant, processor 106 then determines a time value that permits an illumination of display screen 114 for a period of time sufficient to display the message.

Upon illuminating display screen 114 and setting timer 118 to a time value that is determined based on the at least one illumination time parameter, processor 106 decrements (216) the timer, that is, decrements the time value maintained by the timer, to produce a remaining time value. The remaining time value corresponds to a remaining time period for illumination of display screen 114. Processor 106 continues to decrement (216) timer 118 for so long as the remaining time value is greater than zero (218) and the processor does not receive (220) an instruction to terminate the illumination of display screen 114. When, in step 216, the remaining time value is eventually reduced to zero, or when, in step 220, processor 106 receives an instruction to terminate the illumination of display screen 114, whichever first occurs, processor 106 terminates (222) the illumination of display screen 114 by decoupling power to light source 116, and logic flow 200 ends.

By dynamically adjusting an illumination time period of display screen 114 based on the information being displayed on the screen, communication device 100 preserves a life of a limited life power supply 120 powering the telephone. Processor 106 dynamically adjusting an illumination time period of display screen 114 based on a determination of at least one illumination time parameter corresponding to the information to be displayed on display screen 114, such as a length of a message, a number of lines of the display screen required to display a message, or a type of message to be displayed, and maintains a coupling of power to a light source illuminating the display screen for a period of time that is based on the at least one illumination time parameter. In order to provide for further control of the illumination time period and for increased power supply 120 longevity, in another embodiment of the present invention a user of communication device 100 may control whether the display screen is illuminated or whether an illumination of a currently illuminated display screen is prematurely terminated, that is, terminated prior to an expiration of an illumination time period.

In still another embodiment of the present invention, in order to further optimize power supply 120 longevity, an illumination of display screen 114 may be further controlled based on a detected level of ambient light. By including a consideration of ambient light in a determination of whether to illuminate display screen 114, or whether to prematurely terminate an illumination of the display screen, then the display screen may not be illuminated by light source 116 and a remaining life of power supply 120 may be preserved when ambient light is sufficient for viewing the display screen.

Figure 3:
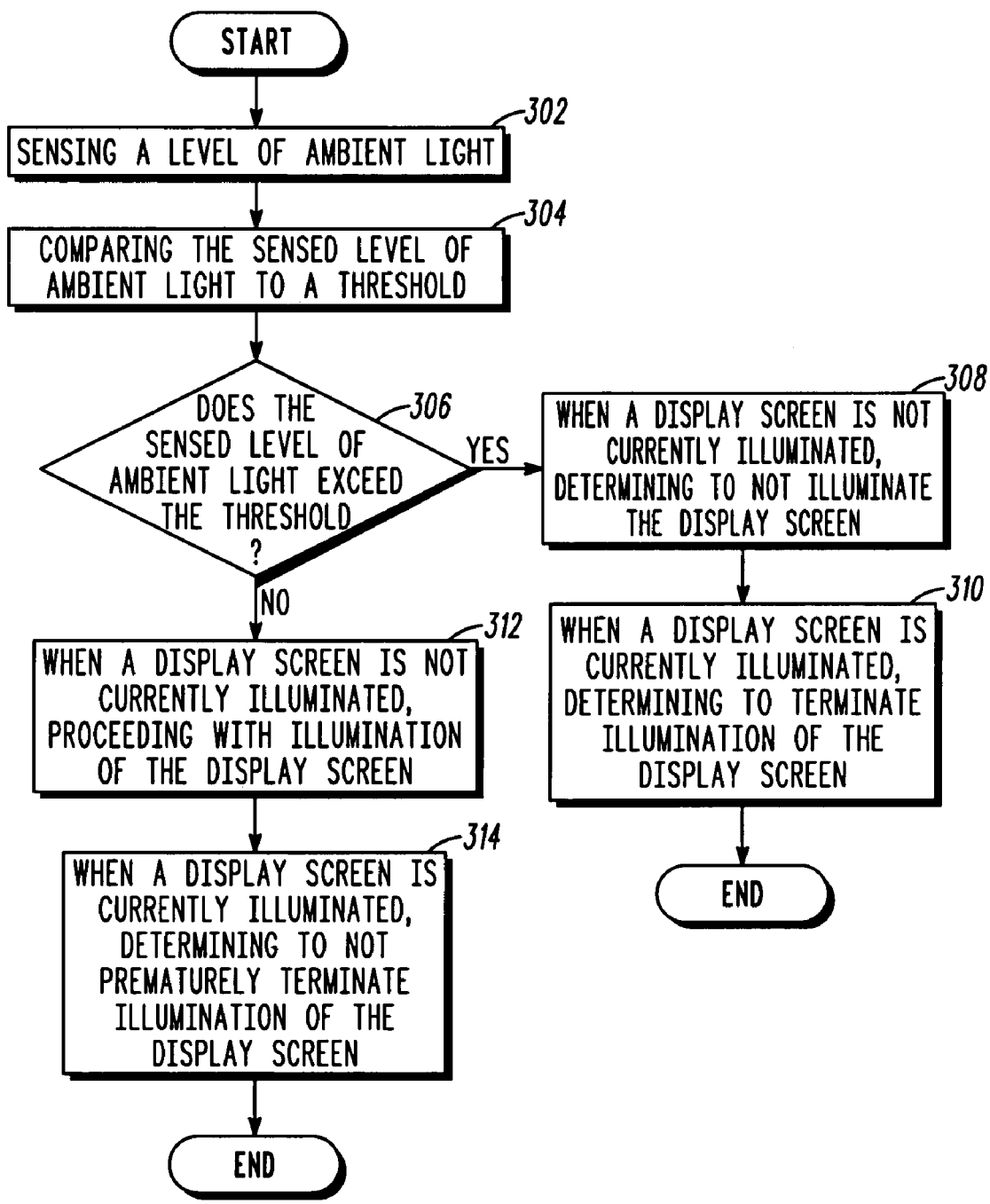
FIG. 3 is a logic flow diagram of a method performed the communication device of FIG. 1 in determining to not illuminate a display screen or to terminate an illumination of a currently illuminated display screen prior to an expiration of an illumination time period in accordance with another embodiment of the present invention.

Referring now to FIG. 3, a logic flow diagram 300 is depicted wherein communication device 100, and in particular processor 106, self-determines, based on a level of ambient light, to not illuminate display screen 114 or to terminate an illumination of the display screen prior to an expiration of the determined illumination time period. Logic flow diagram 300 begins when light sensor 122 senses (302) a level of ambient light and conveys a signal to processor 106 that corresponds to the sensed level of the ambient light. Processor 106 quantizes the ambient light signal if the signal is not in a digital format and compares (304) the ambient light signal to an ambient light threshold. When the ambient light signal exceeds (306) the ambient light threshold and display screen 114 is not currently illuminated, for example, processor 106 has not yet illuminated display screen 114, processor 106 may determine (308) to not illuminate display screen 114. When the ambient light signal exceeds (306) the ambient light threshold and display screen 114 is currently illuminated, processor 106 may determine (310) to terminate the illumination of the display screen prior to expiration of the time period associated with the illumination of the display screen, that is, prior to the remaining time value being reduced to zero. When the ambient light signal is less than (306) the ambient light threshold, processor 106 may proceed (312) with illuminating of display screen 118 or may determine (314) to not terminate the illumination of the currently illuminated display screen prior to the expiration of the period of time, that is, prior to the remaining time value being reduced to zero, whichever is appropriate. Logic flow 300 then ends.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for controlling an illumination of a display screen in portable wireless communication device comprising:
   illuminating the display screen;
   determining at least one illumination time parameter corresponding to a message displayed on the display screen, wherein the at least one illumination time parameter is based on at least one of a length of the message, a number of lines of the display screen required to display the message, and a type of message to be displayed;
   maintaining the illumination of the display screen for a period of time that is based on the at least one illumination time parameter, wherein maintaining the illumination of the display screen for a period of time comprises:
   determining a time value based on the at least one illumination time parameter;
   decrementing the time value to produce a remaining time value; and
   terminating the illumination of the display screen when the remaining time value no longer exceeds zero.

2. The method of claim 1, wherein determining at least one illumination time parameter comprises determining a plurality of illumination time parameters and wherein an illumination time parameter of the plurality of illumination time parameters comprises a time constant.

3. The method of claim 1, further comprising:
   when the display screen is illuminated, receiving an instruction to terminate the illumination of the display screen; and
   in response to receiving the instruction, terminating the illumination of the display screen prior to an expiration of the period of time.

4. The method of claim 1, wherein illuminating a display screen comprises:
   sensing a level of ambient light;
   comparing the level of ambient light to an ambient light threshold;
   when the level of ambient light is greater than the ambient light threshold, determining to not illuminate the display screen; and
   wherein illuminating a display screen comprises illuminating a display screen when the level of ambient light is less than the ambient light threshold.

5. The method of claim 1, wherein maintaining the illumination of the display screen comprises:
   sensing a level of ambient light;
   comparing the level of ambient light to an ambient light threshold; and
   when the level of ambient light is greater than the ambient light threshold, terminating the illumination of the display screen prior to an expiration of the period of time.

6. An apparatus for controlling illumination of a display screen in portable wireless communication device comprising:
   a light source for providing illumination for a display screen;
   a processor coupled to the light source that couples power to the light source to illuminate the display screen, determines at least one illumination time parameter corresponding to a message displayed on the display screen, wherein the at least one illumination time parameter is based on at least one of a length of the message, a number of lines of the display screen required to display the message, and a type of message to be displayed, and maintains a coupling of power to the light source for a period of time that is based on the at least one illumination time parameter;
   a timer coupled to the processor; and
   wherein the processor maintains the illumination of the display screen for a period of time by determining a time value based on the at least one illumination time parameter, wherein the time value corresponds to the period of time, sets the timer based on the time value, decrements the timer to produce a remaining time value, and terminates the illumination of the display screen when the remaining time value no longer exceeds zero.

7. The apparatus of claim 6, wherein the at least one illumination time parameter comprises a plurality of illumination time parameters, wherein an illumination time parameter of the plurality of illumination time parameters comprises a time constant, and wherein the apparatus further comprises a memory device coupled to the processor that maintains the time constant.

8. The apparatus of claim 6, wherein the processor, when the display screen is illuminated, further receives an instruction to terminate the illumination of the display screen and, in response to receiving the instruction, decouples power from the light source prior to an expiration of the period of time.

9. The apparatus of claim 6, wherein the apparatus farther comprises a light sensor coupled to the processor that senses a level of ambient light and conveys a signal corresponding to the sensed level of ambient light to the processor and wherein the processor further compares the level of ambient light to an ambient light threshold that is maintained in a memory device coupled to the processor, couples power to the light source to illuminate the display screen when the level of ambient light is less than the ambient light threshold, and determines to not illuminate the display screen when the level of ambient light is greater than the ambient light threshold.

10. The apparatus of claim 6, wherein the apparatus further comprises a light sensor coupled to the processor that senses a level of ambient light and conveys a signal corresponding to the sensed level of ambient light to the processor and wherein the processor further compares the level of ambient light to an ambient light threshold that is maintained in a memory device coupled to the processor and, when the level of ambient light is greater than the ambient light threshold, terminates the illumination of the display screen prior to an expiration of the period of time.

11. An apparatus for controlling illumination of a display screen in a portable wireless communication device comprising:
- a display screen;
- a light source for illuminating the display screen;
- a processor coupled to the light source that couples power to the light source to illuminate the display screen, wherein the coupling of power to the light source causes the light source to illuminate the display screen;
- a light sensor coupled to the processor that senses a level of ambient light and conveys a signal corresponding to the sensed level of ambient light to the processor; and
- wherein the processor further compares the level of ambient light to an ambient light threshold that is maintained in a memory device coupled to the processor, couples power to the light source to illuminate the display screen when the level of ambient light is less than the ambient light threshold, and determines to not illuminate the display screen when the level of ambient light is greater than the ambient light threshold.

12. The apparatus of claim 11, wherein when the display screen is illuminated and the processor determines that the level of ambient light is greater than the ambient light threshold, the processor terminates illumination of the display screen.

\* \* \* \* \*